United States Patent
Reik et al.

(10) Patent No.: US 6,840,364 B2
(45) Date of Patent: Jan. 11, 2005

(54) POWER TRAIN FOR USE IN MOTOR VEHICLES AND THE LIKE

(75) Inventors: Wolfgang Reik, Bühl (DE); Thomas Rammhofer, Sasbach (DE); Matthias Zink, Ottenhöfen (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 09/931,708

(22) Filed: Aug. 16, 2001

(65) Prior Publication Data

US 2002/0020600 A1 Feb. 21, 2002

(30) Foreign Application Priority Data

Aug. 17, 2000 (DE) .......................................... 100 40 168

(51) Int. Cl.⁷ .............................................. F16D 25/08
(52) U.S. Cl. ............................. 192/85 C; 192/85 CA; 192/91 A
(58) Field of Search ......................... 192/85 CA, 91 A, 192/110 B, 70.27, 70.17, 85 C

(56) References Cited

U.S. PATENT DOCUMENTS

| | | | |
|---|---|---|---|
| 4,729,464 A | * | 3/1988 | Friedmann ............... 192/70.17 |
| 4,995,492 A | * | 2/1991 | Babcock et al. ......... 192/85 CA |
| 5,135,091 A | | 8/1992 | Albers et al. |
| 5,205,387 A | * | 4/1993 | Checa .................... 192/85 CA |
| 5,273,145 A | * | 12/1993 | Corral et al. ............. 192/91 A |
| 5,284,233 A | * | 2/1994 | Feigler ......................... 192/98 |
| 5,377,796 A | | 1/1995 | Friedmann et al. |
| 5,398,796 A | * | 3/1995 | Doremus ............... 192/85 CA |
| 5,409,091 A | | 4/1995 | Reik et al. |
| 5,450,934 A | | 9/1995 | Maucher |
| 5,577,585 A | * | 11/1996 | Corral ...................... 192/91 A |
| 5,632,706 A | | 5/1997 | Kremmling et al. |
| 5,752,591 A | * | 5/1998 | Beyer ........................ 192/85 C |
| 5,863,252 A | | 1/1999 | Friedmann et al. |
| 6,244,409 B1 | * | 6/2001 | Winkelmann et al. .. 192/85 CA |
| 6,260,683 B1 | * | 7/2001 | Rohs et al. .............. 192/70.17 |
| 6,354,188 B1 | * | 3/2002 | Tobiasz ....................... 92/107 |
| 6,360,863 B1 | * | 3/2002 | Young ................... 192/85 CA |
| 6,450,314 B2 | * | 9/2002 | Jackel et al. ............. 192/70.17 |

FOREIGN PATENT DOCUMENTS

| | | |
|---|---|---|
| DE | 44 27 942 A1 | 3/1995 |
| GB | 2 348 259 A | 9/2000 |

* cited by examiner

Primary Examiner—Saul Rodriguez
(74) Attorney, Agent, or Firm—Darby & Darby

(57) ABSTRACT

A power train for use in motor vehicles has a friction clutch including a housing which rotates with the output shaft of the engine and a clutch disc which transmits torque to the input shaft of a change-speed transmission in the engaged condition of the clutch. The clutch can be engaged and/or disengaged by one or more slave cylinders which is or are rotatably mounted on and is or are being held against axial movement relative to the clutch housing. At least one release bearing can be installed between the piston(s) of the slave cylinder(s) and the diaphragm spring of the friction clutch, and a second bearing is or can be installed between the slave cylinder housing(s) and the clutch housing.

47 Claims, 3 Drawing Sheets

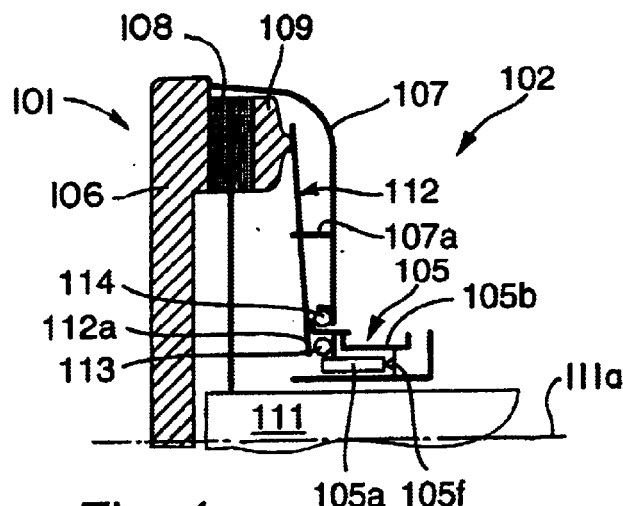
Fig. 4
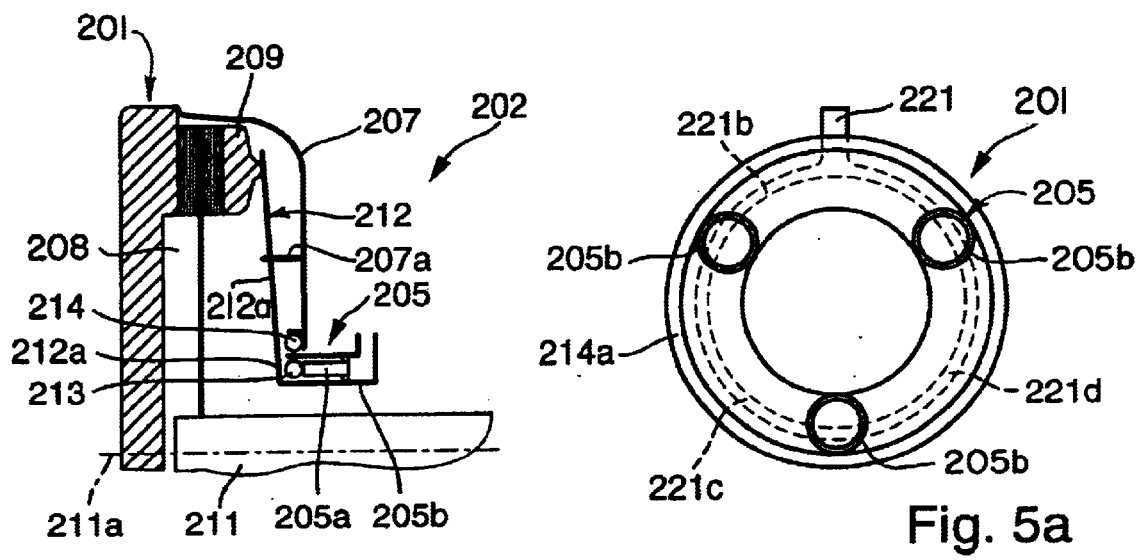
Fig. 5
Fig. 5a
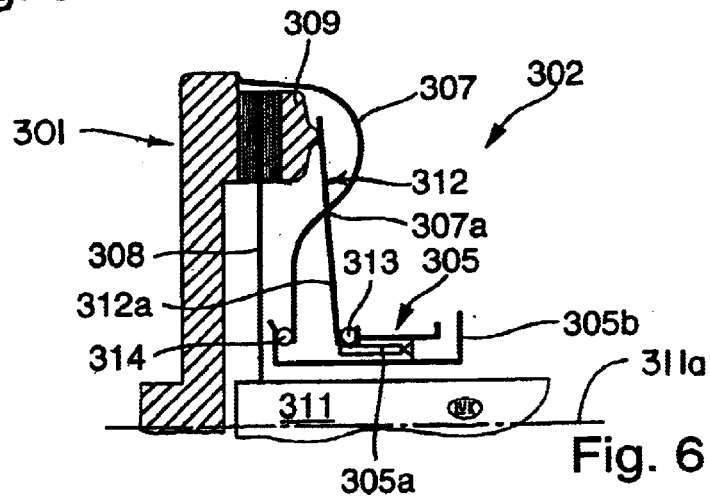
Fig. 6

POWER TRAIN FOR USE IN MOTOR VEHICLES AND THE LIKE

CROSS-REFERENCE TO RELATED CASES

This application claims the priority of the commonly owned copending German patent application Serial No. 100 40 168.6 filed Aug. 17, 2000. The disclosure of the above-referenced priority application, as well as that of each US and foreign patent and patent application identified in the specification of the present application, is incorporated herein by reference.

BACKGROUND OF THE INVENTION

This invention relates to improvements in power trains, especially for use in motor vehicles. More particularly, the present invention relates to improvements in power trains of the type wherein a rotary output member of a prime mover, such as the crankshaft or the camshaft of the engine in a motor vehicle, serves to transmit torque to the rotary input member of a driven unit (e.g., to the input shaft of the change-speed transmission in the power train of a motor vehicle) by way of a friction clutch. Still more particularly, the present invention relates to improvements in means for engaging and/or disengaging the friction clutch to thus respectively establish and interrupt the flow of torque between the prime mover and the driven unit.

In many presently known power trains for use in motor vehicles, the clutch is selectively engageable and disengageable by a fluid-operated coupling system which can include a master cylinder and a slave cylinder having a piston reciprocable in a cylinder or housing and operatively connected with a component part (e.g., a diaphragm spring (also called Belleville spring) or another suitable energy storing device of the clutch) by way of a release bearing. Reference may be had, for example, to commonly owned U.S. Pat. No. 5,632,706 granted May 27, 1997 to Kremmling et al. for "MOTOR VEHICLE WITH ELECTRONIC CLUTCH MANAGEMENT SYSTEM".

It is also known to install the slave cylinder in such a way that it is coaxial with the input shaft of the transmission. Reference may be had, for example, to German patent No. 44 27 942 A1 which discloses a power train wherein the cylindrical housing of the slave cylinder is affixed (e.g., by means of fasteners) to the housing or case of the change-speed transmission. Thus, in order to assemble the power train, the clutch must be mounted on the output member of the prime mover (e.g., on the camshaft or crankshaft of the internal combustion engine), and the clutch engaging/disengaging means (such as the housing and the piston of the slave cylinder) must be mounted on the transmission. The establishment of actual connection between the clutch and the engaging/disengaging means therefor must be carried out in a next-following step. This creates problems when the output member of the prime mover must be realigned with the input member of the change speed transmission, an undertaking which must be carried out rather frequently in the power trains of motor vehicles. Furthermore, it is normally necessary to employ a self-centering system for the clutch release bearing in order to compensate for or to counteract the misalignment of the output member of the prime mover and of the input member of the transmission.

The piston of the slave cylinder in the above outlined conventional power trains is movable axially of the housing of the slave cylinder and, in order to change the condition of (e.g., to disengage) the friction clutch, normally acts axially upon the energy storing element (such as the aforementioned diaphragm spring) of the friction clutch. The body of fluid in the slave cylinder, as well as the piston of this cylinder, react against such housing (i.e., against the case of the change-speed transmission) whenever the piston is to move axially toward the prime mover in order to change the condition of (e.g., to engage) the clutch. In addition, the transmission case must also withstand the force with which the energy storing element of the clutch resists deformation by the piston of the slave cylinder. Otherwise stated, when the clutch of the just described conventional power train is to change its condition (e.g., to be disengaged) as a result of axial movement of the piston relative to the housing of the slave cylinder in response to admission of pressurized fluid into the housing, the flow of power takes place from the energy storing element of the clutch, through the piston of the slave cylinder, through the body of pressurized fluid in the housing of the slave cylinder, through the the just mentioned housing, through the transmission case, through the housing of the engine or another suitable prime mover, through suitable engine supporting or bearing means, and on to the rotary output member (such as the aforementioned crankshaft or camshaft) of the engine. Therefore, all of the just enumerated power transmitting and withstanding parts must be designed (such as dimensioned, configurated and or made of special materials) with a view to reliably withstand the developing forces during the useful life of the power train. Another part which must withstand at least some of the aforediscussed power or force is the housing or cover of the friction clutch; the latter must withstand the forces being transmitted by the energy storing element (hereinafter called spring or diaphragm spring) of the friction clutch.

It is well known that the crankshaft or another rotary output member of the engine in the power train of a motor vehicle invariably performs undesirable stray (such as wobbling and/or axial) movements which must be taken up by the slave cylinder and at least a percentage of which is transmitted from the slave cylinder to the means (such as a pipe and a master cylinder) which is provided to supply pressurized fluid (such as oil or another hydraulic fluid) to the chamber or chambers of the housing (cylinder) of the slave cylinder. The stray movements of the slave cylinder are felt by the operator of the vehicle, namely as vibrations of the clutch pedal, and are or can constitute a cause of considerable discomfort.

If the just discussed operator-controlled combined mechanical and fluid-operated clutch actuating (such as disengaging) system is replaced with an automatic or automated system, e.g., with a system which employs an electrical or electronic actuator in lieu of the fluid-operated master cylinder, the power train exhibits other types of undesirable characteristics such as and especially in connection with (a) reliable and acceptable determination (timing) of the engagement and disengagement of the friction clutch, (b) prolonged transmission of acceptable or optimal torque, and/or others.

Proposals to overcome the above-enumerated problems (such as vibration) in power trains employing manually or automatically operated clutch engaging/disengaging systems include the utilization of various types of antivibration units (also called vibration dampers, vibration filters and antivibration assemblies). Reference may be had, for example, to commonly owned British patent application Serial No. 2 348 259 A wherein the antivibration units are called "damping devices". A drawback of presently known antivibration units is that they are not only bulky, complex and expensive but that they are also far from being a reliable and versatile means for solving the above-enumerated problems. They normally rely upon a throttling action, i.e., they are intended to throttle the undesirable stray movements and/or dampen the noises, they establish space-requiring dead volumes for bodies of fluid and/or they employ expensive materials and/or resort to complex and expensive procedures for the making of several parts in the force transmitting system between the actuator (such as a fluid-operated or electrical actuator means) and one or more parts (such as a diaphragm spring or another resilient element) of the friction clutch.

OBJECTS OF THE INVENTION

An object of the present invention is to provide a novel and improved power train, particularly for use in motor vehicles, wherein the aforediscussed problems and drawbacks of conventional power trains are overcome or at least partially alleviated in a simple, inexpensive and reliable manner.

Another object of the invention is to provide a power train wherein vibrations and/or other undesirable stray movements of parts embodied in and/or associated with the friction clutch are eliminated or at least reduced in a manner which contributes to the safety, comfort and longer useful life of the power train and of the structure (such as a motor vehicle) in which the power train is put to use.

A further object of the instant invention is to provide novel and improved means for changing the condition of the friction clutch in the power train of a motor vehicle.

An additional object of the invention is to provide a novel and improved connection between the constituents (particularly between the friction clutch and the change-speed transmission) of the power train in a motor vehicle.

Still another object of the invention is to provide a novel and improved method of eliminating or reducing the frequency and/or the extent of stray movements of parts in the above outlined power train.

A further object of this invention is to provide a novel and improved power train wherein the friction clutch is actuated (such as engaged) by one or more fluid-operated actuators, such as hydraulically operated slave cylinder(s).

Another object of the invention is to provide a power train wherein the transmission of axial stray movements between the output member of the prime mover and the friction clutch is prevented or reduced in a simple time-, space- and material-saving manner.

An additional object of the invention is to provide a novel and improved arrangement of friction-reducing bearings for use in the above outlined power train.

Still another object of the invention is to provide a novel and improved module including a friction clutch and adapted for use in the power train of a motor vehicle.

A further object of our invention is to provide a power train wherein the stressing of bearing(s), such as of bearing (s) for the input shaft of the change-speed transmission, is less pronounced than in conventional power trains.

Another object of the present invention is to provide a versatile power train which can be put to use in many types of motor vehicles and which renders it possible to gain access to its constituents in a simple and timesaving manner as well as by resorting to readily available (rather than specially designed) implements and/or machines.

An additional object of the invention is to provide a motor vehicle which employs the above outlined power train.

Still another object of the invention is to provide a power train which can be stored and/or transported in practically fully assembled condition for installation at the locale of intended use, e.g., in a motor vehicle.

A further object of the present invention is to provide a novel and improved housing for use in the friction clutch of the above outlined power train.

Another object of the invention is to provide a compact power train wherein the above outlined advantages are achieved without necessitating any, or any appreciable, increases in bulk and/or cost of the power train and/or of the system in which the power train is put or intended to be put to use.

SUMMARY OF THE INVENTION

One feature of the present invention resides in the provision of a power train which comprises an output member (e.g., the camshaft or the crankshaft of an internal combustion engine in the power train of a motor vehicle) rotatable about a predetermined axis, a rotary input member (e.g., the input shaft of the change-speed transmission in the power train of a motor vehicle), and means for transmitting torque between the input and output members (normally in a direction from the output member toward the input member). The torque transmitting means includes an engageable and disengageable clutch, particularly a friction clutch having a housing rotatable with the output member about the predetermined axis, a rotary clutch disc which is arranged to rotate with the input member, and means for selectively coupling the clutch disc to the housing. The coupling means includes at least one cylinder and piston unit having at least one cylinder which, in accordance with an important feature of the invention, is mounted on the housing of the friction clutch in a fixed position, as seen in the direction of the predetermined axis, and is rotatable with reference to the housing.

The arrangement can be such that the at least one cylinder of the at least one cylinder and piston unit is rotatable about the predetermined axis, i.e., about the axis which is common to the output member of the prime mover and to the clutch disc and housing of the friction clutch.

The at least one cylinder and piston unit further comprises a piston, e.g., an annular piston, which is reciprocable in the at least one cylinder of the at least one cylinder and piston unit.

The means for selectively coupling the clutch disc to the housing of the friction clutch can comprise a plurality of cylinder and piston units each of which has a cylinder mounted on the housing of the friction clutch in a fixed position, as seen in the direction of the predetermined axis. Each cylinder is rotatable with reference to the housing of the friction clutch and the cylinders are spaced apart from each other as seen in a circumferential direction of the housing. Such power train can further comprise a support which is rotatably mounted on the housing of the friction clutch and is arranged to carry the cylinders of the aforementioned plurality of cylinder and piston units. The friction clutch normally further comprises a pressure plate which is reciprocable in and relative to the housing, and a clutch spring (such as a diaphragm spring) which is arranged to bias the pressure plate against the clutch disc in the engaged condition of the clutch. Each cylinder and piston unit further includes a piston which is arranged to reciprocate in the respective cylinder in the direction of the predetermined axis relative to the clutch spring and such friction clutch can further employ a disengaging bearing which is interposed between the pistons of the cylinder and piston units and the clutch spring.

If the at least one cylinder of the at least one cylinder and piston unit of the means for selectively coupling the clutch disc to the housing of the friction clutch is coaxial with the housing and is rotatable relative to the housing abut the predetermined axis, the torque transmitting means of the improved power train can further include an antifriction bearing which is interposed between the housing and the at least one cylinder.

In accordance with a further desirable feature of the invention, the power train can further comprise a first bearing which is interposed between the housing and the at least one cylinder. The at least one cylinder and piston unit comprises a piston which is reciprocable in its (at least one) cylinder, and the power train further comprises a second bearing which is interposed between the piston and a resilient element (such as the aforementioned diaphragm spring) of the clutch. The resilient element is arranged to bias the pressure plate of the friction clutch against the clutch disc in the engaged condition of the clutch. The bearings can spacedly surround the predetermined axis, the first bearing can be installed at a first radial distance from such axis and the second bearing can be installed at a second radial distance from the predetermined axis. The first distance can match or approximate the second distance; alternatively, one of the bearings can be mounted to surround the other bearing so that one of the aforementioned distances then exceeds the other distance. It is often advisable to install the two bearings in such a way that they are disposed at identical or nearly identical distances from the output member (as seen in the axial direction).

The means for selectively coupling the clutch disc to the housing of the friction clutch can further include two pressure plates which are disposed in and are rotatable with the housing of the friction clutch and flank the clutch disc. The housing of the friction clutch can be provided with a wall which surrounds the pressure plates, and the piston of the at least one cylinder and piston unit is movable in the at least one cylinder to at least one position in which one of the pressure plates urges the clutch disc into frictional engagement with the other pressure plate to thus engage the friction clutch.

At least a portion of the housing can consist of sheet metal; such housing can constitute a converted blank of metallic sheet material.

The housing can be provided with an annular portion which is nearest to and surrounds the predetermined axis, and the means for selectively coupling the clutch disc to the housing of the friction clutch can further include a bearing which is centered on the annular portion of the housing. The bearing can surround the annular portion of the housing.

The housing of the friction clutch can include a flywheel which is normally driven by the output member of the prime mover, and a cover having a radially outer portion remote from the predetermined axis and being affixed to the flywheel as well as a radially inner portion which is adjacent to but still spaced apart from and surrounds the predetermined axis. The friction clutch of such power train can further comprise at least one component which is disposed in the housing between the flywheel and the cover (as seen in the direction of the predetermined axis).

The improved power train can further comprise means for separably coupling the at least one cylinder of the at least one cylinder and piston unit with the housing of the friction clutch.

An antifriction bearing can be installed between the at least one cylinder of the at least one cylinder and piston unit, and such power train can further comprise means for separably coupling the antifriction bearing with the housing of the friction clutch. The just mentioned coupling means can be arranged to separably connect the housing of the friction clutch with the outer race of the antifriction bearing. The coupling means can include at least one bayonet lock or mount, at least one snap fastener, at least one detent and/or other suitable coupling or connecting means.

At least a portion of the at least one cylinder of the at least one cylinder and piston unit can be made of a suitable plastic material. The at least one cylinder can be of one piece; for example, such one-piece cylinder can be made of a suitable plastic material in an injection molding machine.

The power train can further include at least one fixed component, and the at least one cylinder of the at least one cylinder and piston unit can be arranged to bear upon the at least one fixed coponent while receiving torque from the input or output member. Such power train can employ a variable-speed transmission having an input shaft which includes or constitutes the aforementioned rotary input member. Such transmission can further include a stationary case and the aforementioned fixed component can form part of the transmission case. If the at least one unit is operated by a fluid (such as a hydraulic fluid), the power train further comprises means for supplying fluid from a suitable source (e.g., a pump or a plenum chamber) to the cylinder of the at least one cylinder and piston unit; such fluid supplying means includes at least one conduit for pressurrized fluid and the aforementioned fixed component can form part of the conduit. Alternatively, the fixed component can form part of the housing or case of the transmission which includes an input shaft constituted by or including the aforementioned input member.

The at least one cylinder can be provided with a stop serving to limit the extent of movability of the piston in such cylinder in the direction of the predetermined axis in order to change the condition of the friction clutch.

A first bearing can be interposed between the at least one cylinder and a clutch release bearing which operates between the piston in the at least one cylinder and the diaphragm spring of the friction clutch. The first bearing is preferably disposed between the clutch disc and the release bearing as seen in the direction of the predetermined axis.

Since the friction clutch is subject to wear in response to repeated engagement and disengagement, it is advisable to provide the power train with means for automatically compensating for such wear. The compensating means can include means for changing the axial position of the diaphragm spring in the housing of the friction clutch.

The friction clutch is or can be a push type clutch.

If the at least one cylinder and piston unit is a fluid-operated unit, the power train can further comprise means for automatically supplying fluid to the at least one unit. Such fluid supplying means can include a master cylinder.

The means for transmitting torque between the output member of the prime mover and the housing of the friction clutch can include a wall (e.g., a disc-shaped wall) which is flexible in the direction of the predetermined axis.

In order to simplify the assembly of the power train, the latter can further comprise means for coupling the input member with the clutch disc and means for separably connecting the housing of the friction clutch to the output member of the prime mover so that the clutch disc can remain coupled to the input member before, during and upon separation of the housing from the output member. As already pointed out hereinbefore, the input member can form part of a change-speed transmission.

The power train can include a pilot bearing between the prime mover which includes the output member and the friction clutch. Alternatively, the pilot bearing can be installed between the prime mover and a driven assembly (such as the change-speed transmission in the power train of a motor vehicle) which includes the input member. Still further, the pilot bearing can be utilized to rotatably journal the input member in the output member or vice versa.

Another feature of the present invention resides in the provision of a power train which comprises a prime mover having an output member rotatable about a predetermined axis, a driven unit including a rotary input member coaxial with the output member, and an engageable/disengageable friction clutch serving to transmit torque between the input and output members and including a housing which is rotatable with the output member about the predetermined axis, a clutch disc disposed in the housing and affixed to the input member (at least to the extent that the input member and the clutch disc share all angular movements), a pressure plate which is movable in the direction of the predetermined axis and is arranged to rotate with and is disposed in the housing, an energy storing device which is disposed in the housing and is operable to bias the pressure plate against the clutch disc to thus engage the clutch and establish a torque transmitting connection between the input and output members, and means for engaging the clutch including an actor which is rotatable with and is axially fixed relative to the housing. The actor includes means for moving the energy storing device relative to the housing of the friction clutch.

The clutch engaging means can further include a bearing which is interposed between the actor and the energy storing device.

The actor can constitute an electrically operated actor.

Alternatively, the actor can constitute a mechanically operated actor.

The actor is or can be coaxial with the input and output members.

Since the clutch disc and the pressure plate of the friction clutch are subject to wear in response to repeated engagement and disengagement of the clutch, the power train preferably further comprises means for automatically compensating for such wear; the wear compensating means can include means for moving the energy storing device relative to the housing of the friction clutch.

The prime mover can constitute the engine of a motor vehicle and the driven unit can further include a change-speed transmission.

The friction linings of the clutch disc are engageable by the pressure plate in response to engagement of the friction clutch, and such friction clutch can further include a torsional vibration damper which operates between the friction linings and the input member.

The energy storing device can include or constitute a diaphragm spring and the friction clutch can further comprise a counterpressure plate; such counterpressure plate can form part of the clutch housing and the clutch disc is disposed between the pressure plate and the counterpressure plate (as seen in the direction of the predetermined axis).

The novel features which are considered as characteristic of the invention are set forth in particular in the appended claims. The improved power train itself, however, both as to its construction and the modes of assembling and operating the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 4 is a fragmentary schematic axial sectional view of a power train constituting a second modification of the power train shown in FIG. 2;

FIG. 5 is a fragmentary schematic axial sectional view of a power train constituting a third modification of the power train which is illustrated in FIG. 2;

FIG. 5a is a schematic elevational view of a portion of the power train certain features of which are shown in FIG. 5;

FIG. 6 is a view similar to that of FIGS. 2 and 5 but showing certain features of a power train constituting a fourth modification of the power train which is shown in FIG. 2.

DESCRIPTION OF PREFERRED EMBODIMENTS

Figure 1:
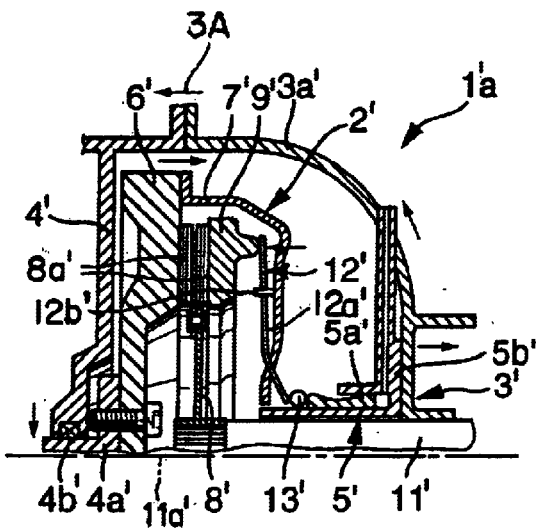
FIG. 1 is a fragmentary schematic axial sectional view of a conventional power train which can be utilized in a motor vehicle.

FIG. 1 shows a portion of a conventional power train 1' which can be put to use in a motor vehicle to drive the front and/or the rear wheels. This power train comprises a prime mover, such as an internal combustion engine, having a body or housing 4' and a rotary output member 4a' (such as the crankshaft or the camshaft of the engine) which is journalled in an antifriction bearing 4b' (such as a ball or roller bearing) mounted in the housing 4'. The output member 4a' serves to drive an input member 11' by way of an engageable and disengageable friction clutch 2'.

The input member 11' constitutes the input shaft of a change-speed transmission 3' having a bell-shaped housing or case 3a' affixed to the engine housing 4'. The clutch 2' includes a pressure plate 9' which is coaxial with a counterpressure plate 6' and is biased by a diaphragm spring 12'. When the clutch 2' is engaged, the diaphragm spring 12' is free or is compelled to bias the pressure plate 9' against the adjacent friction linings 8a' of a clutch disc 8' which is non-rotatably mounted on the input member 11'. The left-hand set of friction linings 8a' then bears upon the adjacent friction surface of the counterpressure plate 6' which rotates with the output member 4a'. The common axis of the members 4a' and 11' is shown at 11a'.

The means for disengaging the clutch 2' includes a slave cylinder 5' having a cylinder or housing 5b' coaxial with the input member 11', and a piston 5a' which is reciprocable in the cylinder 5b' and can act upon the radially inwardly extending tongues or prongs 12a' of the diaphragm spring 12' in a sense to tilt the spring 12' relative to the housing or cover 7' of the clutch 2'. This enables suitable leaf springs or other resilient means (not shown in FIG. 1) to pull the pressure plate 9' away from the counterpressure plate 6' and to thus terminate the frictional engagement between the friction linings 8a' on the one hand, and the adjacent friction surfaces of the plates 6', 9' on the other hand.

The bearing 4b' can constitute but one of several means for rotatably journalling the output member 4a' in the housing 4' of the prime mover of the power train 1'. Such journalling means further serves to hold the output member 4a' against axial movement relative to the housing 4'. The counterpressure plate 6' shares the angular movements of the output member 4a' and transmits such movements to the housing 7' of the friction clutch 2'. The pressure plate 9' is axially movably mounted in and rotates with the housing 7'.

A disengaging bearing 13' is interposed between the piston 5a' of the slave cylinder 5' and the diaphragm spring 12' to permit angular movements of the parts 5a' and 12' relative to each other. The chamber of the cylinder or housing 5b' of the slave cylinder 5' can receive pressurized fluid (such as oil) from a suitable source, e.g., from an actuator-operated master cylinder (not shown in FIG. 1).

When the master cylinder causes the piston 5a' in the housing 5b' of the slave cylinder 5' to perform a forward stroke (in a direction to the left, as viewed in FIG. 1), the release bearing 13' displaces the prongs 12a' of the diaphragm spring 12' so that the latter pivots (at 12b') relative to the housing or cover 7' of the clutch 2' and permits the pressure plate 9' to move axially and away from the counterpressure plate 6'. This releases the clutch disc 8' so that the input member 11' of the transmission 3' no longer shares the angular movements of the output member 4a'. As already mentioned hereinbefore, the pressure plate 9' is biased axially and away from the counterpressure plate 6' (e.g., by leaf springs which are normally employed to ensure that the pressure plate 9' rotates with the housing 7' of the friction clutch 2').

The housing 5b' bears upon the case 3a' of the transmission 3' when the piston 5a' urges the release bearing 13' against the prongs 12a'. The force which the housing 5b' applies to the transmission case 3a' is transmitted from the case 3a' to the housing 4' of the prime mover (see the arrow 3A). The housing 4' transmits the force to the bearing 4b' and hence to the output member 4a'. The latter transmits the force (denoted by the arrow 3A) to the counterpressure plate 6', i.e., to the housing 7' of the friction clutch 2'. The path for the flow of force 3A is thus completed; such force opposes that which is being transmitted by the diaphragm spring 12' during disengagement of the clutch 2'.

The force 3A is opposed by forces generated by several elastic parts the elasticity of which is superimposed upon that of the diaphragm spring 12'. This creates problems when it becomes necessary to ensure partial disengagement (i.e., mere partial engagement) of the clutch 2' with a high or very high degree of accuracy. During such partial engagement, the pressure plate 9' and the counterpressure plate 6' slide relative to the friction linings 8a' of the clutch disc 8' so that the RPM of the clutch disc is less than that of the output member 4a' and of the parts 7', 9' and 12' (it is assumed here that the engine including the housing 4' drives the transmission input shaft 11'). Furthermore, the aforementioned force 3A renders it difficult or plain impossible to fix the point of full frictional engagement between the clutch disc 8' on the one hand, and the pressure plates 6', 9' and output member 4a' on the other hand, i.e., it is difficult or impossible to select the timing of the reduction to zero of slippage between the friction linings 8a' and the adjacent friction surfaces of the plates 6' and 9'. Moreover, the bearing 4b' must be designed to withstand the repeatedly developing opposing forces during the entire useful life of the power train 1'. The designer of the clutch actuating means (including the slave cylinder 5') must take into consideration the tolerances of the bearing 4b'.

Furthermore, the tracking or follow-up of torque, namely a regulation of the clutch 2' in such a way that the engagement between the friction linings 8a' and the plates 6', 9' as caused by the bias of the diaphragm spring 12' is effected in a manner which barely suffices to transmit torque between the members 4a', 11' without slip can be ensured only within the tolerance range established by the aforementioned axial tolerance.

Since the cylinder or housing 5b' bears upon the transmission case 3a', it is centered by the input member 11', and the bearing 13' must perform a self-centering action, i.e., this bearing must compensate for lateral displacements between the members 4a' and 11'.

It is also known to compensate for eccentricity of the cylinder or housing 5b' relative to the member 4a' prior to final mounting of the slave cylinder 5' on the output member 4a' but subsequent to assembly of the transmission case 3a' with the engine housing 4'. This is a complex and time-consuming operation because, as a rule, the transmission case 3a' is not readily accessible subsequent to its attachment to the engine housing 4'.

Figure 2:
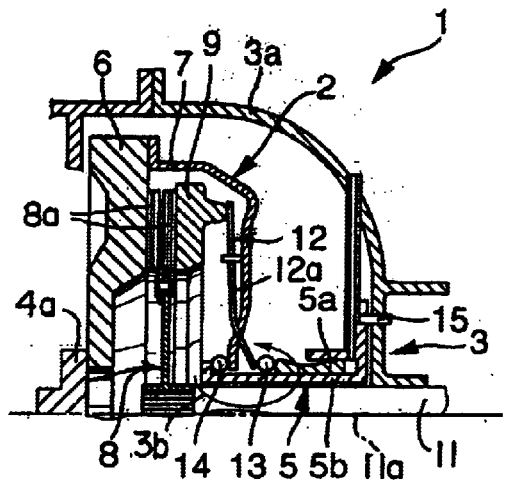
FIG. 2 is a similar fragmentary schematic axial sectional view of a power train which embodies one form of the present invention.

FIG. 2 illustrates certain details of a novel power train 1. All such parts of the power train 1 which are similar to the corresponding parts of the conventional power train 1' shown in FIG. 1 are denoted by similar reference characters but without primes. The friction clutch 2 of the power train 1 is installed in the case or bell 3a of the change-speed transmission 3. The counterpressure plate 6 (this part is actually a flywheel) is mounted on the rotary output member (not shown) of the prime mover, e.g., the combustion engine of a motor vehicle. When the clutch 2 is engaged, the friction linings 8a of the clutch disc or clutch plate 8 cooperate with the pressure plate 9, the counterpressure plate 6 and the diaphragm spring 12 in the same way as already described with reference to FIG. 1. The common axis of these parts is shown at 11a.

In accordance with a feature of the invention which is embodied in the power train 1 including the structure shown in FIG. 2, the cylinder or housing 5b of the slave cylinder 5 (clutch disengaging means) is mounted on the case 3a of the change-speed transmission 3 in such a way that it is held against axial movement but is rotatable relative to the clutch housing 7. To this end, the power train 1 employs an antifriction ball or roller bearing 14 which operates intermediate the clutch housing 7 and the housing or cylinder 5b. The means for holding the housing 5b against axial movement relative to the housing 7 includes at least one coupling pin, stud or post 15 which includes a first portion received in the body of the housing 5b and a second portion received in the body of the transmission case 3a. The piston 5a of the slave cylinder 5 causes the diaphragm spring 12 to store energy during engagement of the friction clutch 2. A disengaging bearing 13 between the piston 5a and the diaphragm spring 12 need not be of the self-centering type due to common centering of the parts 5b and 7.

Since the slave cylinder 5 is mounted directly on the clutch housing 7, the path for the transmission of force is much shorter than in the conventional power train 1' of FIG. 1. Thus, the path now extends in the direction of arrow 3B from the diaphragm spring 12, through the piston 5a to the housing or cylinder 5b and from the latter again directly back to the housing 7 which serves as an abutment or back support for the spring 12. Such shortening of the path for the flow of force from and back to the diaphragm spring 12 renders it possible to narrow the tolerances. Another advantage of the improved power train 1 is that, since the path for the flow of force does not extend through the crankshaft or camshaft (output member) 4a, axial oscillations of such output member do not influence the propagation of force in the power train 1. Otherwise stated, the power train 1 is designed in such a way that the piston 5a and the housing or cylinder 5b of the slave cylinder 5 cannot move relative to each other in a sense and with the result to cause pulsations in the flow of pressurized fluid in the hydraulic system which furnishes pressurized fluid to the cylinder chamber(s) of the housing 5b.

Figure 3:
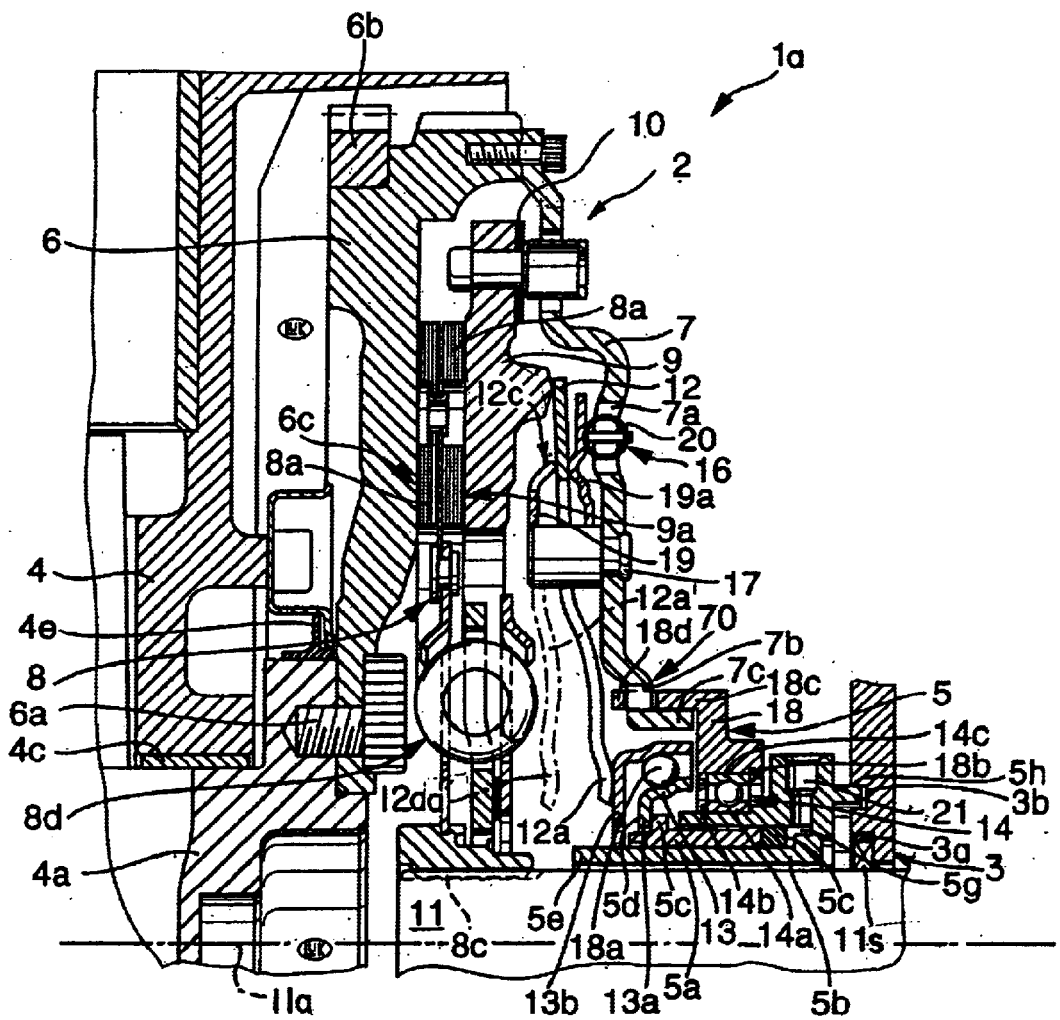
FIG. 3 is a fragmentary axial sectional view of a power train embodying a second form of the present invention.

FIG. 3 shows a portion of a second novel power train 1a. All such parts of the power train 1a which are identical with or clearly analogous to the corresponding parts of the aforedescribed power train 1 shown in FIG. 2 are denoted by the same reference characters and are described and/or referred to only to the extent which is necessary to facilitate an understanding of the operation of the power train 1a and/or the construction and other features of the parts shown for the first time in FIG. 3.

The power train 1a includes a prime mover having a housing 4 and a crankshaft (output member) 4a which is journalled in the housing 4 and is engaged by an annular seal 4e. The crankshaft 4a carries a flywheel 6 which constitutes the counterpressure plate of the friction clutch 2 and has a friction surface 6c adjacent one set of friction linings 8a borne by the clutch disc or clutch plate 8. A friction bearing 4c is interposed between an annular internal surface of the housing 4 and an adjacent annular external surface of the counterpressure plate 6. The latter is non-rotatably but separably secured to the crankshaft 4a by means of threaded fasteners (such as screws) 6a. The peripheral surface of the flywheel or counterpressure plate 6 carries a customary starter gear 6b.

The solid and rather bulky one-piece flywheel or counterpressure plate 6 can be replaced with a composite flywheel (e.g., a so-called dual mass or twin-mass flywheel) without departing from the spirit of the invention which is embodied in the power train 1a. For example, the illustrated one-piece flywheel 6 can be replaced with a set of at least two coaxial disc-shaped flywheels which are turnable relative to each other about a common axis (11a) against the opposition of a suitable energy storing device. Such modified flywheel or counterpressure plate can further comprise a friction generating (hysteresis) device operating in series and/or in parallel with the energy storing device. Reference may be had, for example, to FIG. 10 of commonly owned U.S. Pat. No. 5,863,252 granted Jan. 26, 1999 to Friedmann et al. for "APPARATUS FOR DAMPING VIBRATIONS".

The friction clutch 2 in the power train 1a further comprises a pressure plate 9 which is coaxial with and is movable axially toward and away from the counterpressure plate 6 (hereinafter called flywheel for short). The pressure plate 9 and the flywheel 6 are compelled to share all angular movements; to this end, the clutch 2 comprises a set of substantially tangentially extending leaf springs 10 each having a first end portion riveted or otherwise affixed to the pressure plate 9 and a second end portion affixed to the flywheel 6. Such mounting of the pressure plate 9 enables it to move axially toward and away from the friction surface 6c of the flywheel 6. The clutch 2 is engaged when the friction surface 9a of the pressure plate 9 bears upon the adjacent friction linings 8a of the clutch disc 8 and urges the other set of friction linings 8a to bear upon the friction surface 6c of the flywheel 6. The leaf springs 10 tend to lift the pressure plate 9 off the clutch disc 8, i.e., to disengage the friction clutch 2.

The clutch disc 8 has an annulus of internal teeth 8c which mate with complementary external teeth on the input shaft 11 of the change-speed transmission 3. An annular seal 11s is provided between the transmission shaft (input shaft) 11 and the case or housing of the transmission 3, and the power train 1a further comprises a single-stage or multiple-stage torsional vibration damping device 8d which operates (radially of the axis 11a) between the friction linings 8a and the internal teeth 8c of the clutch disc 8.

In lieu of or in addition to the leaf springs 10, the radially outermost portion of the pressure plate 9 is or can be non-rotatably but axially movably connected to the clutch housing 7, e.g., by means of rivets or the like. The housing 7 is provided with cutouts 7a for certain parts of an automatic wear compensating device 16. The latter serves to compensate for wear upon the friction linings 8a, upon the friction surfaces 6c, 9a, upon the diaphragm spring 12 and, if necessary, upon one or more additional parts of the clutch 2 as a result of repeated engagement and disengagement. Suitable automatic wear compensating devices are disclosed, for example, in commonly owned U.S. Pat. No. 5,409,091 granted Apr. 25, 1995 to Reik et al. for "AUTOMATICALLY ADJUSTABLE FRICTION CLUTCH", and in commonly owned U.S. Pat. No. 5,450,934 granted Sep. 19, 1995 to Maucher for "FRICTION CLUTCH".

The housing 7 of the friction clutch 2 carries an annulus of circumferentially spaced apart rivets 17 and is provided with an annular array of circumferentially spaced apart openings 7a. Still further, the housing 7 has an annular part or extension 7c which serves to center an intermediate member 18. The extension 7c projects toward the transmission case 3c.

The diaphragm spring 12 of the friction clutch 2 bears upon the pressure plate 9 to thus maintain the clutch in the engaged condition when the slave cylinder 5 is inactive, i.e., when its internal (plenum) chamber 5g does not contain a pressurized fluid tending to cause the piston 5a to bear upon the prongs 12a of the spring 12 and to thus disengage the clutch by tilting the diaphragm spring 12 (at 12c) relative to the housing 7. It will be seen that the clutch 2 of FIG. 3 is a push-type clutch.

The diaphragm spring 12 operates not unlike a two-armed lever one arm of which is constituted by an annular main part located radially outwardly of the annular seat 12c on the cover or housing 7, and the other arm of which includes the radially inwardly extending prongs 12a. The seat 12c is defined, at least in part, by a sensor spring 19 of the wear compensating unit 16; this sensor spring cooperates with the rivets 17 in a manner disclosed in the aforementioned U.S. Pat. No. 5,409,091 to Reik et al.

When a new diaphragm spring 12 has undergone a certain amount of initial wear, or when (subsequent to a compensation for wear upon the parts 6, 8, 9 and 12 by the unit 16) such parts have undergone a certain additional wear, the sensor spring 19 yields and enables the diaphragm spring 12 to move nearer to the clutch disc 8 (the inclination of the spring 12 relative to the axis 11a changes in response to progessing wear upon the parts 6, 8, 9 and 12 between successive compensations by the unit 16). Each wear compensation by the unit 16 involves a change in the angular position of an annular member 19a which forms part of the unit 16 and carries ramps cooperating with complementary ramps on the adjacent portion of the clutch housing 7. All this is fully described and shown in the aforementioned U.S. Pat. No. 5,409,091 (Reik et al.) and U.S. Pat. No. 5,450,934 (Maucher). The annular member 19a is turnable by coil springs (one shown in in FIG. 3, as at 20) which cause the ramps of the annular member 19a to slide along the adjacent complementary ramps of the housing 7 and to thus change the axial position of the diaphragm spring 12 with the result that the unit 16 has compensated for wear which developed during the initial stage of utilization of the (then new) clutch 2 or subsequent to preceding compensation for wear. The springs 20 react against the housing 7 and bear upon the annular member 19a.

The annular piston 5a of the slave cylinder 5 can move the tips of the radially inwardly extending prongs 12a of the diaphragm spring 12 axially toward the clutch disc 8. Such tilting of the prongs 12a can take place without a change of fluid pressure in the housing 5b of the slave cylinder 5. The prongs 12a assume the end positions 12aa (shown by dot-dash lines) in the fully extended (left-hand end) position of the piston 5a. The antifriction (ball or roller) bearing 13 between the piston 5a and the tips of the prongs 12a has an inner race 13a which extends radially inwardly into the path of movement of an abutment 5e of the piston 5a so that the bearing 13 shares the leftward axial movements of the piston 5a toward the clutch disc 8. A spring 5d is provided to urge the inner race 13a against the abutment 5e of the piston 5a.

The outer race 13b of the bearing 13 between the piston 5a and the prongs 12a of the diaphragm spring 12 directly contacts the prongs 12a because it extends beyond the inner race 13a, as seen in the direction of the axis 11a and toward the clutch disc 8. The piston 5a is a hollow cylinder which surrounds and is guided by the housing 5b. A sealing ring 5f is recessed into the piston 5a and/or into the housing 5b to prevent uncontrolled escape of pressurized fluid which is admitted into the plenum chamber 5g of the slave cylinder 5 when the piston 5a is to perform a forward stroke toward the clutch disc 8.

The external surface of that axial end of the housing 5b which is nearer to the clutch disc 8 is provided with the radially extending abutment or stop 5e which limits the extent of movability of the piston 5a relative to the parts 5b and 8; this ensures that the piston 5a cannot move the prongs 12a beyond the phantom-line positions 12aa regardless of the pressure of fluid in the plenum chamber 5g. The wear compensating device 16 could be actuated (to compensate for non-existent wear upon the parts 6, 8, 9 and 12) if the piston 5a were capable to pivot and/or to otherwise move the prongs 12a of the diaphragm spring 12 beyond the positions 12aa. The stop 5e can form an integral part of the housing 5b (e.g., it can be of one piece with an injection molded plastic housing) or it can constitute a separately produced part (such as a wire ring) which is partially recessed into or otherwise affixed to the housing 5b.

The plenum chamber 5g can receive pressurized fluid from a source by way of a conduit 21. The source can constitute a master cylinder which is operated by a mechanical or electrical actuator. For example, the master cylinder can be operated by a clutch pedal which is depressed by the operator of the motor vehicle to disengage the clutch 2 via the body of pressurized fluid in the chamber 5g, the piston 5a, the bearing 13 and the prongs 12a of the diaphragm spring 12. Reference may be had, for example, to commonly owned U.S. Pat. No. 5,135,091 granted Aug. 4, 1992 to Albers et al. for "APPARATUS FOR OPERATING CLUTCHES IN MOTOR VEHICLES". The aforementioned electrical actuator can replace the mechanical actuator (pedal).

The housing 5b of the slave cylinder 5 is surrounded by an antifriction bearing (such as a ball or roller bearing) 14 having an outer race 14c and a stop 14a abutting the housing 5b. A safety ring 14b of the bearing 14 also serves to engage the housing 5b. This further ensures that the housing 5b is maintained in an axially fixed position. The intermediate ring 18 surrounds the bearing 14 and is provided with an abutment 18a as well as with a collar 18b to hold the bearing 14 and the housing 5b in axially fixed positions relative to the housing 7. A cylindrical axial extension 18c of the intermediate ring 18 surrounds an axial extension 7c of the housing 7 and extends into the housing 7 by way of the openings 7b. That end of the extension 18c which is disposed in the housing 7 is provided with circumferentially extending portions 18d forming part of means (70) for coupling the extension 18 to the housing 7. Such coupling means 70 can include a bayonet lock or mount. In lieu of a bayonet mount (18d), one can also employ suitable snap fastener means, tongue-and-groove connectors and/or other types of cooperating male-female connections serving to preferably separably secure the extension 18c to the housing 7. It is also possible to establish a fixed axial connection between the parts 7 and 18.

In order to prevent the housing 5b from rotating with the clutch 2, this housing is provided with an axially enlarged (widened) projection 5h which extends into a groove or blind bore or hole 3b of the transmission case 3a.

The housing 5b can constitute a one-piece part which is or which can be made of a suitable plastic material. The same applies for the intermediate member 18; e.g., the parts 5b and 18 can be mass-produced in a suitable injection molding machine. The portions 5h or their equivalents can be provided during injection molding of the respective housings 5b; this renders it possible to achieve additional savings in time and cost.

FIGS. 4, 5–5a and 6 respectively show certain details of three additional novel power trains 101, 201 and 301 respectively having friction clutches 102, 202, 302 with clutch housings 107, 207, 307. These housings respectively mount slave cylinders 105, 205 and 305. Each of the clutches 102, 202, 302 is a push-type clutch, and these clutches respectively comprise energy storing elements 112, 212, 312 each of which is a diaphragm spring and each of which acts as a two-armed lever. Each of these diaphragm springs has a circumferentially complete annular radially outer (main) portion abutting the adjacent axially movable pressure plate 109, 209, 309, and a radially inner portion composed of tongues or prongs 112a, 212a, 312a extending from the respective main portion and into the path of movement of the respective clutch disengaging or release bearing 113, 213, 313. The release bearings 113, 313 are movable axially by the respective discrete slave cylinders 105, 305, and the release bearing 213 is movable axially by a set of three parallel equidistant slave cylinders 205.

Those portions of the diaphragm springs 112, 212, 312 which are disposed between the respective annular main portions and the respective sets or arrays of prongs 112a, 212a, 312a are tiltable relative to annular seats 107a, 207a, 307a provided on the respective clutch housings 107, 207, 307. The dimensions and/or the positions of the illustrated seats 107a, 207a, 307a are not necessarily to scale and/or in positions as actually mounted in the respective friction clutches 102, 202 and 302. Furthermore, the power trains 101, 201, 301 including the structures respectively shown in FIGS. 4, 5–5a and 6 merely constitute three of a much larger group of analogous power trains which embody certain features of the present invention but depart, either slightly or considerably, from those shown in FIGS. 4, 5–5a and 6. For example, the power trains 101, 201, 301 can embody at least some features of at least one of the power trains 1 and 1a respectively shown in FIGS. 2 and 3 and/or of the power train 401 shown in FIG. 7 and/or of numerous conventional power trains including that shown in and described with reference to FIG. 1 and those shown and described in the patents and/or patent applications and/or other literature identified in the specification of the present application.

By way of example only, the push-type clutch 102, 202 and/or 302 can be replaced with a pull-type clutch. As described herein, the term "push-type clutch" denotes a friction clutch which is normally engaged. Thus, and referring for example to FIG. 4, when the slave cylinder 105 is idle, the main portion of the diaphragm spring 112 is free to bias the pressure plate 109 against the clutch disc 108 so that the latter bears upon the counterpressure plate (flywheel) 106 of the friction clutch 102 with a force which is necessary to ensure that the RPM of the transmission input shaft (input member) 111 matches that of the output shaft (not shown) of the prime mover, i.e., of the shaft which drives the flywheel 106. The clutch 102 is disengaged when the diaphragm spring 112 permits the pressure plate 109 to move axially of and away from the flywheel 106 so that the clutch disc 108 is no longer compelled to rotate with the parts 106, 109.

A pull-type friction clutch is normally disengaged. The diaphragm spring of a pull-type clutch is mounted in the housing or cover in such a way that it acts as a one-armed lever. When not acted upon by the slave cylinder(s), such diaphragm spring permits the pressure plate to move away from the counterpressure plate. The clutch 102 can be converted into a pull-type clutch by mounting a suitable diaphragm spring in such a way that its seat on the housing 107 is located radially outwardly of the region of contact between such diaphragm spring and the pressure plate 107. Thus, when the slave cylinder 105 is actuated, it causes the just described diaphragm spring (one-armed lever) to bear upon the pressure plate 107 and to urge the pressure plate toward the counterpressure plate 106, i.e., against the clutch disc 108. A pull-type clutch is disengaged when the slave cylinder or another actuator pulls the prongs of the modified diaphragm spring away from the clutch disc 108, i.e., the piston 105*a* of the slave cylinder 105 must be coupled to the prongs of the modified diaphragm spring.

It is also known to employ two additional types of friction clutches. Clutches of a third type can be said to constitute "pressed-down clutches" and are characterized in that they are disengaged when idle and become engaged in response to a push exerted by the mechanical, electric or other suitable actuator. The clutches of the fourth category or type are known as "pulled-down clutches" and are normally disengaged. A clutch of such type is engaged in response to a pull exerted by the actuator. Strictly speaking, the actuating means for the clutches of the third and fourth types are not clutch disengaging means but rather clutch engaging means.

Referring again to the power trains 101, 201 and 301, these power trains respectively further comprise antifriction bearings 114, 214, 314 which are installed between the housings 107, 207, 307 and the cylinders or housings 105*b*, 205*b*, 305*b* of the respective slave cylinders 105, 205 and 305. The release bearings 113, 213, 313 are installed in such a way that they can pull the prongs 112*a*, 212*a*, 312*a* of the respective diaphragm springs 112, 212, 312 away from the respective clutch discs 108, 208, 308 when the pistons 105*a*, 205*a*, 305*a* in the respective cylinders or housings 105*b*, 205*b*, 305*b* are caused to move to the right, as viewed in FIGS. 4, 5 and 6.

The power trains 101, 201, 301 of FIGS. 4, 5–5*a*, 6 differ from each other mainly in the manner of mounting the slave cylinders 105, 205, 305 on the respective clutch housings 107, 207, 307. Thus, and referring first to FIG. 4, the axis 111*a* of the input member 111 of the change-speed transission coincides with that of the clutch 102 as well as with that of the slave cylinder 105. The piston 105*a* in the cylinder or housing 105*b* of the slave cylinder 105 is a tubular body which carries a radially and/or axially acting annular seal 105*f*. The release bearing 113 is borne by and is located radially outwardly of the piston 105*a* to thus achieve savings in space as considered in the direction of the axis 111*a*. However, and if such savings in space are not critical or not considered to be significant, it is also possible to install the piston 105*a* and the release bearing 113 end-to-end, i.e., at the same radial distance from the axis 111*a*.

The cylinder or housing 105*b* of the slave cylinder 105 shown in FIG. 4 is enlarged to accommodate the release baring 113, and the latter is surrounded by the antifriction bearing 114, i.e., the bearings 113, 114 are located at or close to the same distance from the clutch disc 108 (as seen in the direction of the axis 111*a*), at least in the illustrated engaged condition of the friction clutch 102. The cylinder or housing 105*b* of the slave cylinder 105 is held against axial movement with respect to but can rotate around the housing 107 of the clutch 102.

The power train 201 of FIGS. 5 and 5*a* differs from the power train 101 of FIG. 4 in that it comprises three slave cylinders 205 which are equidistant from each other, as seen in the circumferential direction of the clutch housing 207. The number of slave cylinders can be reduced to two or increased to four or more, and the housing 205*b* of each slave cylinder 205 is held against axial movement reative to the housing 207. The utilization of three slave cylinders 205 constitutes a presently preferred feature of the power train 201.

The pistons 205*a* of all three slave cylinders 205 cooperate with a common release bearing 213 which can displace the prongs 212*a* of the diaphragm spring 212 in the direction of the axis 211*a* toward the clutch disc 208 in order to disengage the friction clutch 202. The release bearing 213 can be replaced with a ring (not shown) which is coaxial with the clutch housing 207, which is borne by the tips of the prongs 212*a* of the diaphragm spring 212, and which is in mere point contact with the left-hand end portions of the pistons 205*s* (as seen in FIG. 5). The pistons 205*a* are or can be rotatable about their respective axes and in or with the respective cylinders or housings 205*b*.

The housings 205*b* of the slave cylinders 205 are individually rotatable relative to the clutch housing 207 and are carried by the latter by way of an antifriction bearing 214 in such a way that they are held against axial movement relative to the input member 211 of the change-speed transmission. The bearing 214 is mounted on the clutch housing 207 in a fixed axial position.

It is also within the purview of the present invention to mount the slave cylinders 205 on a receiving member or support which, in turn, is mounted on the clutch housing 207 by way of the bearing 214 or an equivalent thereof.

FIG. 5*a* shows a ring-shaped receiving member or support 205*b*' which can be made of a metallic material (such as aluminum) or of a plastic material, e.g., in an injection molding or die casting machine. The member 205*b*' is or can be rigid (e.g., of one piece) with the cylinders or housings 205*b* of the three slave cylinders 205 shown in FIG. 5*a*. The reference character 221 denotes a conduit which connects the member 205*b*' with a source of pressurized fluid, e.g., with a master cylinder, not shown, and the member 205*b*' is provided with channels 221b, c, d which convey fluid to and from the cylinders or housings 205b of the respective slave cylinders 205. It is also possible to provide the member 205b' with a single channel which supplies pressurized fluid to or receives fluid from all three housings 205b. A stop 214a on the member 205b' extends radially outwardly to constitute the means, or a component of the means, for preventing axial movements of the antifriction bearing 214 relative to the clutch housing 207. A split ring (not shown) which is recessed into an external circumferential groove of the housing 207 can cooperate with the stop 214a to hold the bearing 214 and the cylinders or housings 205b of the three slave cylinders 205 in selected optimum axial positions relative to the clutch housing.

The channels 221b, 221c and 221d can be provided in the receiving member or support 205b' during making (such as casting or molding) of such part; e.g., they can constitute grooves in an internal surface of the member 205b', and such internal surface can overlie a sealing sleeve or the like. One or more suitable seals can be interposed between the internal sleeve and the internally grooved member 205b'. It is also possible to provide the channels or grooves 221b, 221c, 221d in that end face of the member 205b' which faces away from the clutch disc 208 and to place a suitable annular seal next to such end face. All that counts is to provide the structure of FIGS. 5 and 5a with suitable means for supplying pressurized fluid to the slave cylinders 205 when the clutch 202 is to be at least partly disengaged as a result of pivoting of the diaphragm spring 212 relative to the clutch housing 207 and its seat 207a.

An advantage of the power train 201 which employs several slave cylinders 205 is apparent under the circumstances when the space which is available under the hood of a motor vehicle, or any other space allotted for the power train, is small or very small so that the servicing or the repair work cannot be carried out by moving the input shaft 211 exclusively in the direction of the axis 211a. Thus, all that is necessary in connection with the power train 201 is to move the left-hand end of the input shaft 211 (as seen in FIG. 5) to the right of the housing or cylinder 205b; the shaft 211 is thereupon removable by moving it radially outwardly of the axis 211a between two neighboring cylinders or housings 205b or vice versa. This renders it unnecessary to detach one or more slave cylinders 205 and the transmission from the clutch housing 207 prior to separation of the input shaft 211 from the clutch 202.

When the slave cylinder (such as 5, 105 or 305) is coaxial with the input shaft 11, 111 or 311 (see FIGS. 3, 4 and 6), the input shaft 11, 111 or 311 can be moved sideways from the illustrated position and out of axial alignment with the clutch 2, 102 or 302 only upon disengagement or termination of a separable connection (such as a plug-and-socket connection, a bayonet lock or mount or a snap fastener unit) between the slave cylinder 5, 105 or 305 (which is coaxial with the input shaft 11, 111 or 311) and the housing 7, 107 or 307. This necessitates the utilization of a tool which is introduced into the gap between the housing of the prime mover and the housing or case of the respective change-speed transmission. The slave cylinder 5, 105 or 305 is then ready to be detached from the respective clutch housing 7, 107 or 307.

A further advantage of the power train 201 of FIGS. 5 and 5a is that the plural (such as three) pistons 205a need not constitute hollow cylindrical bodies so that they can properly seal the surrounding portions of the respective cylinders or housings 205b by resorting to simpler and less expensive but nevertheless more reliable sealing elements. Moreover, one can employ seals which must be effective only within relatively short stages of axial movements of the pistons 205a. Still further, the stroke-to-diameter ratio of a simple piston 205a is much more satisfactory than that of a hollow cylindrical piston (such as 5a) which is more likely to carry out undesirable tilting or wobbling movements relative to its housing or cylinder (such as 5b), especially if the tips of prongs of the diaphragm spring are not disposed in a common plane extending at right angles to the clutch axis.

Referring to FIG. 6, the slave cylinder 305 is coaxial with and spacedly surrounds the input shaft 311 of the change-speed transmission in the power train 301. The housing or cylinder 305b of the slave cylinder 305 is rotatably mounted on an antifriction roller or ball bearing 314 so that it can turn relative to the clutch housing 307 about the axis 311a. The release bearing 313 is spaced apart from the roller bearing 314, as seen in the direction of the axis 311a, but is or can be installed at the same radial distance from such axis. The bearing 314 enables the slave cylinder 305 to turn about the axis (311a) of the clutch housing 307 but prevents the housing 305b from moving axially.

An advantage of the power train 301 embodying the structure of FIG. 6 is that it can employ small-diameter bearings 313 and 314. Portions of the prongs 312a of the diaphragm spring 312 extend outwardly through openings in the clutch housing 307; this renders it possible to install the release bearing 313 outside of the clutch housing 307. The other bearing 314 is installed in the clutch housing 307 between the clutch disc 308 and the prongs 312a (as seen in the direction of the axis 311a). This renders it possible to achieve substantial savings in space as seen in the direction of the axis 311a.

Figure 7:
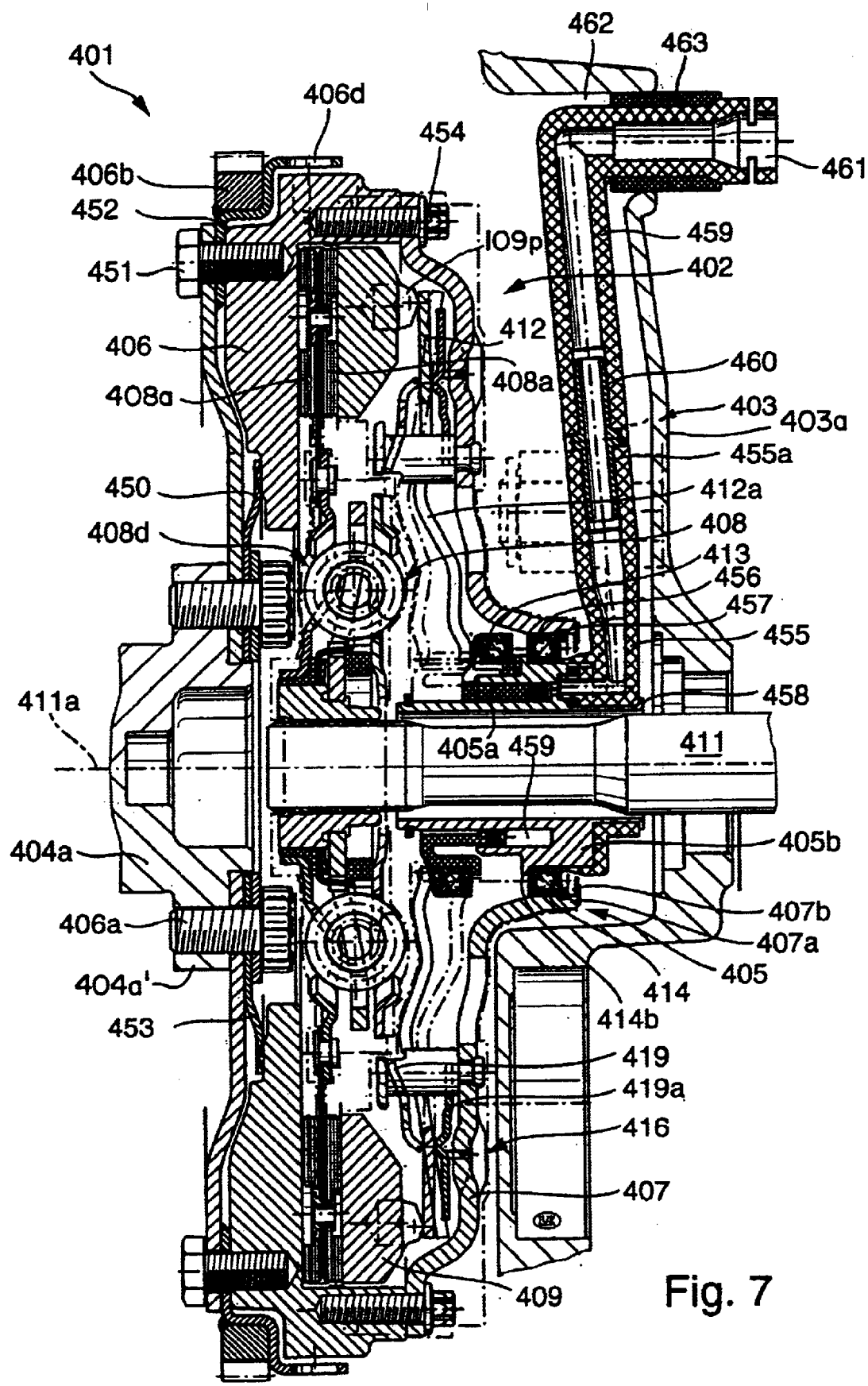
FIG. 7 is a fragmentary axial sectional view similar to that of FIG. 3 but showing certain relevant details of a power train constituting a fifth modification of the power train which is illustrated in FIG. 2.

FIG. 7 shows a portion of a power train 401 which constitutes a modification of the power train 1a of FIG. 3. One of the differences between the power trains 1a and 401 is that the latter employs a friction clutch 402 which is mounted on the output member (such as a crankshaft) 404a of the prime mover (such as an internal combustion engine of a motor vehicle) in a different way than shown for the friction clutch 2 and the output member 4a in the power train 1a. Thus, the output member 404a carries an axially flexible disc-shaped connector or wall 450 which is affixed to a collar 404a' of the member 404a by threaded fasteners 406a. The radially outer portion of the connector or wall 450 is affixed to a flywheel 406 by threaded fasteners 451. The flywheel 406 constitutes an equivalent of the counterpressure plate 6 in the power train 1a of FIG. 3. The radially outermost portion of the flywheel 406 carries or is of one piece with an annular part 452 which serves as a carrier for a starter gear 406b. The annular part 452 further serves as a carrier for customary ignition marks 406d.

A washer-like axially resilient element 453 is affixed to the wall 450 and output member 404a by the aforementioned fasteners 406a; this element 453 serves to bias the wall 450 axially while reacting against the counterpressure plate 406. The latter cooperates with an axially movable pressure plate 409 of the friction clutch 402 to flank a clutch disc or clutch plate 408 of the clutch. The pressure plate 409 is urged axially of and away from the counterpressure plate 406 by a set of leaf springs (not shown) which ensure that the plate 409 can move axially of within but cannot turn relative to the housing or cover of the clutch 402.

The disc 408 has two sets of friction linings 408a one of which is engaged by the friction surface of the counterpressure plate 406 and the other of which is contacted by the friction surface of the pressure plate 409 when the clutch 402 is engaged. A torsional vibration damper 408d operates between the friction linings 408a and a transmission input shaft (input member) 411 of the power train 401. A diaphragm spring 412 in the housing or cover 407 of the clutch 402 reacts against this cover and its circumferentially complete radially outermost portion bears upon suitable projections 409p of the pressure plate 409. The power train 401 further comprises an automatic wear compensating unit 416 for the friction clutch 402. The wear compensating unit 416 is or can be of the type disclosed in the aforementioned U.S. Pat. No. 5,409,091 to Reik et al. or in the aforementioned U.S. Pat. No. 5,450,934 to Maucher. FIG. 7 shows energy storing elements 419, 419a which form part of the wear compensating unit 416.

The clutch housing or cover 407 can constitute a converted sheet metal blank which has undergone deforming treatment in a press or in a deep drawing machine. The radially outermost portion of this housing or cover 407 is secured to the counterpressure plate (flywheel) 406 by screws or analogous fasteners 454 located radially outwardly of the axially movable pressure plate 409. The fasteners 454 can be replaced by one or more welded seams, by rivets, by threaded fasteners other than 454 and/or by any other means capable of ensuring that the parts 406, 409 rotate as a unit and are held against axial movement relative to each other. The parts 408, 409 and 412 are installed within the housing 407 which can be said to form part of or to include the counterpressure plate (flywheel) 406.

In order to properly mount the slave cylinder 405, the clutch housing or cover 407 is provided with an internal axial extension 407a having a window or opening 407b for the cylinder or housing 405b of the slave cylinder 405. An antifriction ball or roller bearing 414 is installed on the housing or cylinder 405b of the slave cylinder 405 and is held against axial movement by a stop 414b of the housing 405b as well as by a conduit 455 which serves to supply pressurized fluid to an internal chamber (plenum chamber) 459 of the housing 405b. The parts 455, 414b flank the bearing 414 in the direction of the common axis 411a of the input member 411 and the output member 404a. The bearing 414 is centered by an internal surface 456 of the axial extension 407a of the cover 407. A split ring 437 is employed to hold the outer race of the bearing 414 against axial movement out of the extension 407a and toward the case 403a of the change-speed transmission 403.

The conduit 455 has an end portion which is adjacent the housing or cylinder 405b and extends in parallelism with the axis 411a. An inlet 455a of the conduit 455 is coupled to a second conduit 459 by a tubular plug 460. The character 458 denotes an axial stop which is provided on the housing or cylinder 405b and serves to hold the conduit 455 against movement in the direction of the axis 411a and away from the piston 405a of the slave cylinder 405. The conduit 455 is or can be operatively connected with the slave cylinder 405 in a first step which is followed by introduction or making of the stop 458. The latter constitutes a radially outwardly deformed outer end portion of the cylinder or housing 405b; this stop can be replaced by or used in conjunction with one or more snap fasteners, bayonet mounts or other suitable means for properly coupling the conduit 455 with the housing or cylinder 405b of the slave cylinder 405.

The conduit 459 is affixed to the case 403a of the transmission 403 by way of a sleeve 463 which is received in an opening 462 of the transmission case 403a. The upper half of the piston 405a is shown in FIG. 7 in a retracted position, and the lower half of this piston is shown in the extended position in which the friction clutch 402 is disengaged because the release bearing 413 has tilted the diaphragm spring 412 by way of the prongs 412a so that the pressure plate 409 is free to move axially and away from the counterpressure plate (flywheel) 406 to thus at least partially release the clutch disc 408.

FIG. 7 shows that the bearings 413, 414 are disposed at the same or practially the same distance from the axis 411a and that the bearing 413 is located between the bearing 414 and the clutch disc 408, as seen in the direction of the common axis 411a of the input and output members 411, 404a. The bearing 413 is or can be identical with the bearing 414.

The conduits 455, 459 can be replaced with a one-piece pipe or conduit without departing from the spirit of the invention which is embodied in the power train 401. The illustrated design including two discrete conduits 455, 459 and a hollow coupling plug 460 between them is preferred if the power train 401 employs different types of transmission cases 403a so that one and the same slave cylinder 405 should or must be connected to a discrete conduit 459 installed in any one of several types of transmission cases 403a. The free end 461 of the conduit 459 can be coupled to a fluid supplying and/or receiving pipe (not shown) in any suitable manner. A plug can be employed to seal the free end 461 when the conduit 459 is disconnected from the source of pressurized fluid. The free end 461 extends (but need not always extend) in at least substantial parallelism with the common axis 411a of the clutch 402 and the change-speed transmission 403.

The sleeve 463 is or can be resilient and can be used to transmit force between the conduit 459 and the transmission case 403a. The cylinder or housing 405b of the slave cylinder 405 is held against axial movement relative to the transmission case 403a and the clutch housing 407 by the conduits 455, 459; the coupling 460 holds the conduits 455, 459 against movement out of axial alignment with each other, and the sleeve 463 holds the conduit 459 against movement relative to the opening or window 462 of the transmission case 403a.

Axially flexible connectors or walls of the type shown at 450 in FIG. 7 are customary in numerous conventional power trains, e.g., in those disclosed in commonly owned U.S. Pat. No. 5,377,796 granted Jan. 3, 1995 to Friedmann et al. for "APPARATUS FOR TRANSMITTING FORCE BETWEEN ROTARY DRIVING AND DRIVEN UNITS". An advantage of such wall in the power train 401 is that the friction clutch 402 and the change-speed transmission 403 can be assembled into a unit which is adapted to be affixed to or detached from the engine or another prime mover of a motor vehicle in a simple and time-saving manner. Such types of undertakings are necessary during initial assembly of the power train 401 as well as in the course of or for certain types of maintenance and/or repair work. This saves much time because the conduits or conductors to and from hydraulic or electrical actuators for the slave cylinder(s) need not be interrupted or detached. For example, it is not necessary to interrupt the hydraulic connection between a pump (which is borne by the transmission) and the slave cylinder or cylinders. A module including the friction clutch and the change-speed transmission or the clutch and the engaging/disengaging means therefor need not be dismantled at all and normally need not be attended to during the entire useful life of the power train.

If the actuator of the clutch engaging/disengaging system is an electric machine, it can include or constitute an electric motor or an electromagnetic valve with an electromagnetically shiftable piston, pusher, plunger or the like. It is often advantageous to employ an axially movable electrically operated spindle or feed screw. The spindle can include a helical spring with convolutions which abut each other except in the regions of engagement with te rotation tansmitting means, i.e., the means for moving the coil spring axially in order to change the condition of the friction clutch.

Still further, it is possible to employ mechanical clutch engaging/disengaging actuator means which is designed to exert a push and/or a pull upon the diaphragm spring of the friction clutch. For example, such mechanical actuator means can employ a Bowden wire or a suitable linkage as a part of or the entire means for connecting the clutch pedal of a motor vehicle with the friction clutch or to connect the latter with another type of actuator. The arrangement can be such that the mechanical actuator is designed to cause a change in the condition of the friction clutch by initiating a push or pull movement at least substationally tangentially of the rotary input and/or output member. Such push and/or pull movement is transmitted to a rotary (turnable) clutch engaging and/or disengaging element. The element can be provided with one or more ramps cooperating with one or more stationary ramps to effect the axial movement of the aforementioned element. Reference may be had to the wear compensating systems or units which are disclosed in the aforediscussed U.S. Pat. No. 5,409,091 (Reik et al.) and U.S. Pat. No. 5,450,934 (Maucher) and which employ ramps as a means for effecting axial displacements of a rotary actuating member.

Certain advantages which are common to all or nearly all described and illustrated embodiments of the improved power train include the feature that not even a portion of the path for the transmission of force which the piston(s) of the slave cylinder(s) transmits or transmit to the diaphragm spring of the friction clutch is defined by the part(s) of the prime mover; this reduces the stressing of the bearing or bearings for the rotary output member (such as a camshaft or a crankshaft) of the prime mover, i.e., such bearing is not or such bearings are not affected by repeated engagements and disengagements of the friction clutch.

Furthermore, eventual axial vibrations of the output member of the prime mover cannot adversely influence the engagement or disengagement of the clutch because the slave cylinder(s) shares or share such axial vibrations of the output member. Otherwise stated, the novel power train prevents any undesirable influencing (such as additional compression) of the hydraulic fluid in the slave cylinder or cylinders because the piston or pistons of the slave cylinder (s) need not move axially relative to the respective slave cylinder housing or housings due to the fact that such housing(s) shares or share all axial oscillations of the output member of the prime mover. This renders it possible to prevent oscillations of the clutch pedal or of other types of actuator means. Moreover, the novel mounting of the slave cylinder(s) renders it possible to dispense with standard damping or antivibration units of the type disclosed, for example, in the aforementioned British patent application Serial No. 2 348 259 A.

A further advantage of the improved power train is that, if the friction clutch is actuated by automatic engaging/ disengaging means (e.g., if the means for supplying pressurized fluid to the slave cylinder(s) includes a hydraulic pump, at least one master cylinder or an electric motor or another suitable actuator), the controls for the clutch engaging/disengaging means are or can be much more sensitive and accurate than conventional controls. The controls can operate with lesser tolerances because they are not influenced, or not unduly influenced, by vibrations. Moreover, and since the damper or dampers often employed in standard power trains is or are no longer necessary, the hystereses developing due to the utilization of dampers can be reduced or eliminated.

Another important advantage of the improved power train is that it need not employ a self-centering release bearing for the friction clutch. Thus, one can resort to a simple, compact and inexpensive release bearing. One of the reasons is that the absence of exact alignment of the output member of the prime mover with the input member of the change-speed transmission is of no consequence within a wide range of such misalignments if the slave cylinder(s) is or are mounted on the clutch housing in accordance with the present invention.

If a single slave cylinder is coaxial with the input member of the transmission, it is provided with a circular central opening for reception of the input member with requisite play. The piston of such single slave cylinder is a hollow cylinder or ring which can act upon the prongs of the diaphragm spring, preferably by way of a release bearing.

The placing of the release bearing (such as 113) next to the slave cylinder (such as 105) exhibits the aforediscussed advantage involving savings in space (as seen in the direction of the axis 111a) as well as substantial (actually unexpectedly large) savings in space in the radial direction when compared with conventional power trains wherein the slave cylinder is mounted on the transmission case. Such savings in space are even more pronounced if the release bearing (such as 113) is surrounded by the antifriction bearing (114) which operates between the clutch housing (107) and the housing or cylinder (105b) of the slave cylinder (105).

As concerns the savings in material and especially expensive material for the making of the improved power train, substantial savings can be achieved by the previously discussed expedient of employing sheet metal and/or a plastic material. For example, the housing of the friction clutch can be made of a suitable metallic sheet material and can include a radially inner portion (see, for example, the housing 307 shown in FIG. 6) which carries and centers one race of the bearing (314) for the slave cylinder (305).

If the cylinder or housing of a single slave cylinder (such as 5) is connected with the antifriction bearing (13), the inner race (13a) of such bearing is secured to the housing or cylinder 5b against axial movement (as at 5e and 18). Such parts can constitute a module which is ready to be attached to the clutch housing (7) by resorting to a bonding (such as welding), riveting or caulking operation; alternatively, the connection can be of the readily releasable or separable type, e.g., by means of threaded fasteners, detents, snap fasteners, a bayonet mount or the like. If the part 18 is of one piece with the clutch housing, the bearing 13 can be mounted directly on such clutch housing. Separable connections are preferably designed for disengagement by readily available tools or machines which are put to use when it becomes necessary to rapidly detach the transmission from the engine for the purposes of maintenance, repair or replacement and the space which is available under the hood does not suffice to separate the transmission from the engine without prior detachment of the slave cylinder(s) from the clutch housing.

One-piece slave cylinder housings are preferred in many instances because a conventional two-piece slave cylinder housing which is customary in many types of conventional power trains and which is mounted on the transmission case cannot readily stand axial compressive stresses which must be transmitted to the clutch cover in a radial direction.

One-piece slave cylinder housings of sheet metal or a plastic material are preferred in numerous types of power trains which embody the present invention. Such one-piece slave cylinder housings of sheet metal or of injection molded or otherwise processed plastic material can be used with great advantage. The plastic material can be reinforced by glass fibers or the like.

The means for preventing rotation of the slave cylinder(s) with the clutch housing can include the aforementioned pin or pins, such as 15, other types of projections or other means capable of withstanding friction between the slave cylinder (s) and the clutch housing, e.g., friction generated by the bearings (such as 13 and 14).

The axial movements of the piston(s) of the slave cylinder (s) relative to the cylinder housing(s) are preferably limited on the aforediscussed ground that excessive axial displacements of the piston and of the associated release bearing could result in unnecessary actuation of the wear compensating unit (such as 16).

It is also within the purview of the present invention to utilize at least one slave cylinder wherein the piston is axially fixedly mounted on the clutch housing and the housing or cylinder of such slave cylinder is movable in the axial direction of the input and output members to thus engage or disengage the friction clutch. The means for coupling the piston to the clutch housing can include a ring or the like. The release bearing is then disposed between the prongs of the diaphragm spring and the axially movable cylinder or housing of the slave cylinder. Such release bearing can be adjacent to the antifriction bearing between the piston and the clutch housing, as seen in the axial or radial direction of the input and output members. The two bearings can have identical or different diameters.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of power trains for use in motor vehicles and the like and, therefore, such adaptations should and are intended to be comprehended within the meaning and range of equivalence of the appended claims.

What is claimed is:

1. A power train, comprising:
   a prime mover having an output member rotatable about a predetermined axis;
   a driven unit having a rotary input member; and
   means for transmitting torque between said input and output members, including
   an engageable and disengageable friction clutch having a housing rotatable with said output member about said axis, a rotary clutch disc arranged to rotate with said input member, a pressure plate, and a clutch spring arranged to bias said pressure plate against said clutch disc in the engaged condition of said friction clutch;
   means for disengaging said friction clutch, including at least one cylinder and piston unit having at least one cylinder mounted on said housing so that it is axially fixed while being rotatable with reference to said housing, wherein said cylinder and piston unit is operable to disengage the friction clutch by exerting a pushing force on said clutch spring and thereby releasing said bias of the pressure plate against the clutch disc; and
   means for reversibly and separably coupling said at least one cylinder with said housing within confines of a clutch space so that only the friction clutch has to be maneuvered off of the rotary input member for separating the prime mover from the driven unit without requiring further disassembly to be performed on the driven unit.

2. The power train of claim 1, wherein said at least one cylinder is rotatable about said predetermined axis.

3. The power train of claim 1, wherein said at least one unit further comprises an annular piston reciprocable in said at least one cylinder.

4. The power train of claim 1, wherein said means for selectively coupling comprises a plurality of cylinder and piston units each having a cylinder mounted on said housing in a fixed position, as seen in the direction of said axis, and rotatable with reference to said housing, said cylinders being spaced apart from each other in a circumferential direction of said housing.

5. The power train of claim 4, further comprising a support rotatably mounted on said housing and arranged to carry said cylinders of said plurality of cylinder and piston units.

6. The power train of claim 4, wherein said clutch further comprises a pressure plate reciprocable in said housing relative to said housing and a clutch spring arranged to bias said pressure plate against said clutch disc in the engaged condition of said clutch, each of said units further having a piston reciprocable in the respective cylinder in the direction of said axis relative to said clutch spring, and said clutch further having a disengaging bearing interposed between said pistons and said clutch spring.

7. The power train of claim 1, wherein said at least one cylinder is coaxial with said housing and is rotatable relative to said housing about said axis, said torque transmitting means further including an antifriction bearing interposed between said housing and said at least one cylinder.

8. The power train of claim 1, further comprising a first bearing interposed between said housing and said at least one cylinder, said at least one unit further comprising a piston reciprocable in said at least one cylinder and a second bearing interposed between said piston and a resilient element of said clutch, said resilient element being arranged to bias a pressure plate of said clutch against said clutch disc in the engaged condition of said clutch.

9. The power train of claim 8, wherein said bearings spacedly surround said axis, said first bearing being disposed at a first radial distance from said axis and said second bearing being disposed at a second radial distance from said axis.

10. The power train of claim 9, wherein said first distance at least approximates said second distance.

11. The power train of claim 9, wherein one of said bearings surrounds the other of said bearings.

12. The power train on claim 9, wherein said bearings are disposed at least substantially identical distances from said output member as seen in the direction of said axis.

13. The power train of claim 1, wherein at least a portion of said housing consists of sheet metal.

14. The power train of claim 13, wherein said portion of said housing is a converted blank.

15. The power train of claim 1, wherein said housing includes an annular portion nearest to and surrounding said axis, said means for disengaging the friction clutch further including a bearing centered by said annular portion.

16. The power train of claim 15, wherein an intermediate ring surrounds said bearing and includes a feature for holding the bearing in an axially fixed position relative to the housing.

17. The power train of claim 1, wherein said housing of said clutch includes a flywheel and a cover having a radially outer portion remote from said axis and affixed to said flywheel and a radially inner portion adjacent to but spaced apart from and surrounding said axis, said clutch further having at least one component disposed in said housing between said flywheel and said cover as seen in the direction of said axis.

18. The power train of claim 1, further comprising an antifriction bearing between said at least one cylinder and said housing, and means for separably coupling said bearing with said housing of said friction clutch.

19. The power train of claim 18, wherein said bearing has an outer race and said coupling means is arranged to separably connect said housing with said outer race.

20. The power train of claim 18, wherein said coupling means is selected from the group consisting of a bayonet lock, a snap fastener and a detent.

21. The power train of claim 1, wherein at least a portion of said at least one cylinder consists of a plastic material.

22. The power train of claim 1, wherein said at least one cylinder is of one piece.

23. The power train of claim 1, wherein said at least one cylinder is an injection molded part.

24. The power train of claim 1, further comprising at least one fixed component, said at least one cylinder being arranged to bear upon said at least one fixed component while receiving torque from one of said input and output members.

25. The power train of claim 24, further comprising a variable-speed transmission having an input shaft including said rotary input member, said transmission further comprising a stationary case and said fixed component forming part of said case.

26. The power train of claim 24, wherein said at least one cylinder and piston unit is a fluid-operated unit and further comprising means for supplying fluid to said at least one cylinder and piston unit including a conduit for pressurized fluid, said at least one fixed component forming part of said conduit.

27. The power train of claim 24, further comprising a variable-speed transmission having an input shaft including said rotary input member and a stationary case, said at least one fixed component including at least one projection extending in at least substantial parallelism with said axis, connected with one of said case and said at least one cylinder and arranged to abut a stop of the other of said case and said at least one cylinder.

28. The power train of claim 1, wherein said at least one cylinder and piston unit further includes a piston reciprocable in said at least one cylinder in the direction of said axis to thereby change the condition of said clutch, said at least one cylinder having a stop arranged to limit the extent of movability of said piston in the direction of said axis.

29. The power train of claim 1, further comprising a first bearing interposed between said at least one cylinder and a clutch release bearing between a piston of said at least one unit and an energy storing element of said clutch, said first bearing being disposed between said clutch disc and said release bearing as seen in the direction of said axis.

30. The power train of claim 1, wherein said clutch is subject to wear in response to repeated engagement and disengagement thereof, and further comprising means for automatically compensating for said wear.

31. The power train of claim 1, wherein said at least one cylinder and piston unit is a fluid-operated unit and further comprising means for automatically supplying fluid to said at least one unit.

32. The power train of claim 31, wherein said means for automatically supplying fluid to said at least one unit includes a master cylinder.

33. The power train of claim 1, further comprising means for transmitting torque between said output member and said housing including a wall flexible in the direction of said axis.

34. The power train of claim 1, further comprising means for coupling said input member with said clutch disc and means for separably connecting said housing to said output member so that said clutch disc can remain coupled to said input member prior, during and upon separation of said housing from said output member.

35. The power train of claim 34, wherein said input member forms part of a change-speed transmission.

36. The power train of claim 1, further comprising a pilot bearing between a prime mover including said output member and said clutch.

37. The power train of claim 1, further comprising a pilot bearing between a prime mover including said output member and a driven assembly including said input member.

38. The power train of claim 1, further comprising a pilot bearing rotatably journalling one of said input and output members in the other of said input and output members.

39. A power train, comprising:
a prime mover having an output member rotatable about a predetermined axis;
a driven unit including a rotary input member coaxial with said output member; and
an engageable and disengageable friction clutch arranged to transmit torque between said input and output members and including
a housing rotatable with said output member about said axis,
a clutch disc disposed in said housing and affixed to said input member,
a pressure plate movable in the direction of said axis and arranged to rotate with and disposed in said housing,
an energy storing device disposed in said housing and operable to bias said pressure plate against said clutch disc to thus engage the clutch and establish a torque transmitting connection between said input and output members, and
means for disengaging said friction clutch including an actor rotatable with and axially fixed relative to said housing, said actor including means for exerting a pushing force on said clutch spring and thereby releasing said bias of the pressure plate against the clutch disc; and
means for reversibly and separably coupling said actor with said housing within confines of a clutch space so that only the friction clutch has to be maneuvered off of the rotary input member for separating the prime mover from the driven unit without requiring further disassembly to be performed on the driven unit.

40. The power train of claim 39, wherein said clutch disengaging means further includes a bearing interposed between said actor and said energy storing device.

41. The power train of claim 39, wherein said actor is an electrically operated actor.

42. The power train of claim 39, wherein said actor is a mechanically operated actor.

43. The power train of claim 42, wherein said actor is coaxial with said input and output members.

44. The power train of claim 39, wherein said clutch disc and said pressure plate are subject to wear in response to repeated engagement and disengagement of said clutch, and further comprising means for automatically compensating for said wear including means for moving said energy storing device relative to said housing.

45. The power train of claim 39, wherein said prime mover is the engine of a motor vehicle and said driven unit further includes a change-speed transmission.

46. The power train of claim 39, wherein said clutch disc includes friction linings engageable by said pressure plate and a torsional vibration damper between said friction linings and said input member.

47. The power train of claim 39, wherein said energy storing device includes a diaphragm spring and said clutch further comprises a counterpressure plate forming part of said housing, said clutch disc being disposed between said pressure plate and said counterpressure plate as seen in the direction of said axis.

* * * * *